US010442974B2

(12) United States Patent
Whitfill et al.

(10) Patent No.: US 10,442,974 B2
(45) Date of Patent: Oct. 15, 2019

(54) METHODS OF ENHANCING FLUID LOSS CONTROL USING ADDITIVES

(71) Applicant: Halliburton Energy Services, Inc., Houston, TX (US)

(72) Inventors: Donald Lee Whitfill, Kingwood, TX (US); Sharath Savari, Stafford, TX (US); Matthew L. Miller, Spring, TX (US); Dale E. Jamison, Humble, TX (US); Robert J. Murphy, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/103,509

(22) PCT Filed: Jan. 14, 2014

(86) PCT No.: PCT/US2014/011396
§ 371 (c)(1),
(2) Date: Jun. 10, 2016

(87) PCT Pub. No.: WO2015/108501
PCT Pub. Date: Jul. 23, 2015

(65) Prior Publication Data
US 2016/0312102 A1 Oct. 27, 2016

(51) Int. Cl.
*E21B 21/00* (2006.01)
*C09K 8/42* (2006.01)
(Continued)

(52) U.S. Cl.
CPC ............ *C09K 8/426* (2013.01); *C09K 8/5045* (2013.01); *C09K 8/5083* (2013.01); *C09K 8/512* (2013.01);
(Continued)

(58) Field of Classification Search
CPC .............................. E21B 21/003; E21B 33/138
See application file for complete search history.

(56) References Cited

U.S. PATENT DOCUMENTS 3,818,998 A    6/1974   Hessert
4,422,948 A   12/1983   Corley et al.
(Continued)

FOREIGN PATENT DOCUMENTS

WO      2015108501 A1    7/2015

OTHER PUBLICATIONS

Savari et al., "Engineered LCM Design Yields Novel Activating Material for Potential Application in Severe Lost Circulation Scenarios," North Africa Technical Conference & Exhibition, Cairo, Egypt, Apr. 2013, SPE 164748.
(Continued)

*Primary Examiner* — Andrew Sue-Ako
(74) *Attorney, Agent, or Firm* — Tenley Krueger; C. Turney Law Group PLLC

(57) ABSTRACT

In some instances, a fluid loss control enhancement additive may synergistically work with lost circulation materials ("LCM") to arrest lost circulation in wellbores where LCMs alone have been ineffective. For example, a method may involve treating a wellbore penetrating a subterranean formation with a pill comprising an aqueous base fluid and a lost circulation material; observing fluid loss from the wellbore to the subterranean formation while treating the wellbore with the pill; and adding salt, a swellable polymer, and fibers to the pill.

15 Claims, 2 Drawing Sheets

(51) Int. Cl.
*E21B 33/138* (2006.01)
*C09K 8/504* (2006.01)
*C09K 8/508* (2006.01)
*C09K 8/512* (2006.01)
*C09K 8/514* (2006.01)
*C09K 8/52* (2006.01)

(52) U.S. Cl.
CPC ............ *C09K 8/514* (2013.01); *E21B 21/003* (2013.01); *E21B 33/138* (2013.01); *C09K 8/52* (2013.01); *C09K 2208/08* (2013.01)

(56) References Cited

U.S. PATENT DOCUMENTS

| | | | |
|---|---|---|---|
| 4,670,501 A | 6/1987 | Dymond et al. | |
| 5,680,900 A | 10/1997 | Nguyen et al. | |
| 2002/0040812 A1 | 4/2002 | Heying | |
| 2003/0104949 A1* | 6/2003 | Myers | C04B 40/0633 507/100 |
| 2004/0168804 A1* | 9/2004 | Reddy | C09K 8/5083 166/295 |
| 2006/0237192 A1* | 10/2006 | Shaarpour | C09K 8/04 166/294 |
| 2010/0193244 A1 | 8/2010 | Hoskins | |
| 2010/0282470 A1* | 11/2010 | Alberty | E21B 33/138 166/308.1 |
| 2010/0307747 A1* | 12/2010 | Shindgikar | C09K 8/516 166/276 |
| 2012/0073828 A1* | 3/2012 | Churchill | E21B 21/103 166/373 |
| 2012/0322695 A1* | 12/2012 | Kefi | C09K 8/32 507/118 |

OTHER PUBLICATIONS

International Search Report and Written Opinion for PCT/US2014/011396 dated Oct. 28, 2014.

* cited by examiner

METHODS OF ENHANCING FLUID LOSS CONTROL USING ADDITIVES

BACKGROUND

The embodiments described herein relate to fluid loss control enhancement additives, and methods and systems relating thereto.

While drilling a wellbore penetrating a subterranean formation, the drilling fluid being circulated through the wellbore may be lost into the surrounding formation. Fluids are typically lost into the formation through fractures induced by excessive mud pressures, pre-existing open fractures, or large openings with structural strength in the formation. In addition to underground blowouts, cross flow, and loss of hydrostatic pressure, lost circulation can lead to a drill pipe becoming lodged in the wellbore. In some instances, drilling may be terminated to allow for a remedial operation to be performed.

In some drilling operations when lost circulation is observed, the wellbore may be treated with lost circulation materials ("LCM") for plugging the portion of formation through which the fluids are being lost. A variety of LCMs have been used or proposed for arresting lost circulation of drilling fluids. Examples of such materials may include fibrous materials, flaky materials, granular materials, and settable slurries. However, in some instances, the lost circulation may be so severe that traditional lost circulation materials are not effective at arresting lost circulation. Therefore, there continues to be a need for compositions and methods for treating a wellbore exhibiting lost circulation.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
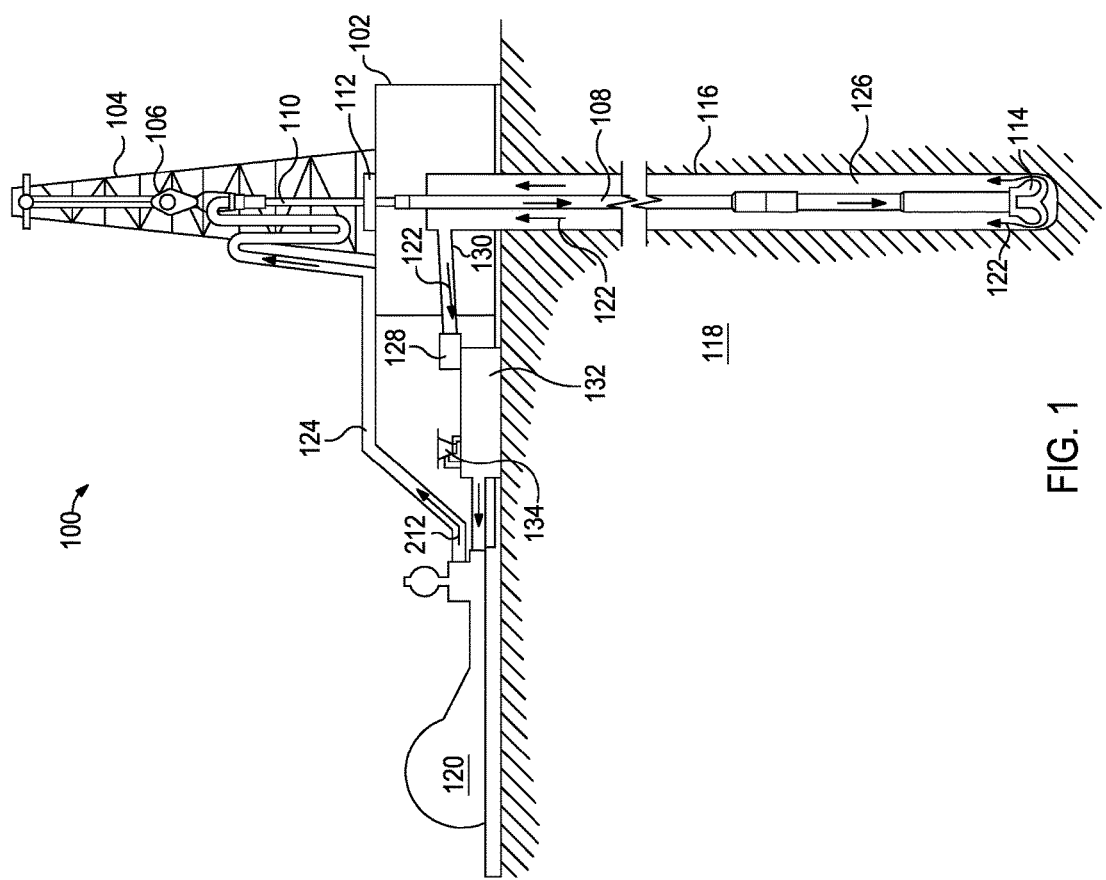
FIG. 1 shows an illustrative schematic of a system that can deliver lost circulation pills of the present disclosure to a downhole location, according to one or more embodiments.

The embodiments described herein relate to fluid loss control enhancement additives, and methods and systems relating thereto.

In some embodiments, the fluid loss control enhancement additives described herein synergistically work with LCMs to stop or at least reduce lost circulation in wellbores where LCMs alone have been ineffective. The fluid loss control enhancement additives described herein generally include a combination of a salt, a swellable polymer, and fibers.

In some instances, a wellbore having been treated with LCMs (e.g., as part of a lost circulation pill) may continue to lose fluid into a portion of the surrounding subterranean formation (e.g., at a rate of about 100-200 barrels per hour or greater, including up to total fluid loss). Then, the wellbore may be treated with the fluid loss control enhancement additives described herein. As used herein, a "pill" refers to a relatively small volume of specially prepared wellbore fluid placed or circulated in the wellbore.

In some embodiments, the fluid loss control enhancement additives described herein may be introduced into the wellbore as a pill that may optionally also include the LCMs. For example, a lost circulation pill that includes the LCMs may be used to treat a wellbore experiencing fluid loss. In some embodiments, where loss continues during administration of the lost circulation pill fluid, the fluid loss control enhancement additives described herein may be added (simultaneously or independently) to the lost circulation pill. In alternative embodiments, where loss continues after administration of the lost circulation pill, the wellbore may be treated with a separate pill that includes the fluid loss control enhancement additives described herein.

Examples of LCMs suitable for use in a lost circulation pill described herein may include, but are not limited to, sand, shale, ground marble, bauxite, ceramic materials, glass materials, metal pellets, high strength synthetic fibers, cellulose flakes, wood, resins, polymer materials (crosslinked or otherwise), polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, composite particulates, and the like, and any combination thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and the like, and any combination thereof.

In some embodiments, the LCMs may be included in a lost circulation pill in an amount ranging from a lower limit of about 40 ppb, 60 ppb, or 80 ppb to an upper limit of about 120 ppb, 100 ppb, or 80 ppb, and wherein the amount of LCMs may range from any lower limit to any upper limit and encompasses any subset therebetween. In some instances, the concentration of LCMs may be increased during the lost circulation pill (or in a series of lost circulation pills) when performing the initial fluid loss control operation.

Examples of salts suitable for use in the lost circulation pills described herein may include, but are not limited to, sodium chloride, sodium bromide, potassium chloride, potassium bromide, and the like, and any combination thereof.

In some embodiments, a salt may be included in a lost circulation pill in an amount ranging from a lower limit of about 0.5 ppb, 0.8 ppm, or 1 ppb to an upper limit of about 2.5 ppb, 2 ppb, or 1 ppb, and wherein the amount of salt may range from any lower limit to any upper limit and encompasses any subset therebetween.

In some instances, water swellable polymers suitable for use in the fluid loss control enhancement additives described herein may absorb greater than about 10 times its weight of water. In some instances, water swellable polymers suitable for use in the lost circulation pills described herein may swell to greater than about 10 times its volume as it absorbs water. In some embodiments, a combination of the foregoing may occur.

Examples of swellable polymers suitable for use in the lost circulation pills described herein may include, but are not limited to, a crosslinked polyacrylamide, a crosslinked polyacrylate, a copolymer of acrylamide and acrylate monomers, a starch backbone grafted with acrylonitrile and acrylate, hydrolyzed polyacrylonitrile, a carboxyalkyl cellulose, a carboxymethyl starch, a salt of carboxymethyl cellulose, a carboxyalkyl polysaccharide, and the like, and any combination thereof. Other examples of swellable polymers suitable for use in the lost circulation pills described herein may include, but are not limited to, a polymer of two or more of allylsulfonate, 2-acrylamido-2-methyl-1-propanesulfonic acid, 3-allyloxy-2-hydroxy-1-propane-sulfonic acid, acrylamide, an acrylic acid monomer, N-vinylpyrrolidone, and the like.

In some embodiments, the swellable polymers may be in the form of particles before swelling, wherein at least some of the particles have a diameter ranging from a lower limit of about 0.5 mm, 1 mm, or 2 mm to an upper limit of about 5 mm, 4 mm, or 3 mm, and wherein the diameter of the particles may range from any lower limit to any upper limit and encompasses any subset therebetween.

In some embodiments, a swellable polymer may be included in a lost circulation pill in an amount ranging from a lower limit of about 1 ppb, 2 ppb, or 3 ppb to an upper limit of about 10 ppb, 7 ppb, or 5 ppb, and wherein the amount of swellable polymer may range from any lower limit to any upper limit and encompasses any subset therebetween.

Examples of fibers suitable for use in the lost circulation pills described herein may include, but are not limited to, viscose cellulosic fibers, oil coated cellulosic fibers, carbon fibers, melt-processed inorganic fibers, basalt fibers, wollastonite fibers, non-amorphous metallic fibers, ceramic fibers, glass fibers, polymeric fibers, polypropylene fibers, poly(acrylic nitrile) fibers, and the like, and any combination thereof.

In some embodiments, fibers may be included in a lost circulation pill in an amount ranging from a lower limit of about 0.25 ppb, 0.5 ppb, or 1 ppb to an upper limit of about 3 ppb, 2 ppb, or 1.5 ppb, and wherein the amount of fibers may range from any lower limit to any upper limit and encompasses any subset therebetween.

The lost circulation pills described herein may include aqueous base fluids. Aqueous base fluids suitable for use in the lost circulation pills described herein may comprise fresh water, saltwater (e.g., water containing one or more salts dissolved therein), brine (e.g., saturated salt water), seawater, or combinations thereof. Generally, the water may be from any source, provided that it does not contain components that might adversely affect the stability and/or performance of the lost circulation pills and fluid loss control enhancement additives described herein. In some embodiments, fresh water or water with monovalent salts may be preferred as aqueous base fluids.

In some embodiments, after treating the wellbore with the fluid loss control enhancement additives described herein, the wellbore may be treated with a clean-up fluid so as to return permeability to the portion of the wellbore, the subterranean formation, or both treated with the fluid loss control enhancement additives. For example, some of the swellable polymers described herein may be at least partially acid-degradable. In some embodiments, after treating the wellbore with the fluid loss control enhancement additives described herein, the swellable polymer may be contacted by a clean-up fluid that includes an acid or acid-generating compound.

Examples of acids suitable for use in conjunction with the treatment fluids described herein may include, but are not limited to, hydrochloric acid, hydrobromic acid, hydrofluoric acid, formic acid, acetic acid, chloroacetic acid, dichloroacetic acid, trichloroacetic acid, fluoroacetic acid, difluoroacetic acid, trifluoroacetic acid, methanesulfonic acid, citric acid, and the like, and any combination thereof.

Examples of acid-generating compounds suitable for use in conjunction with the treatment fluids described herein may include, but are not limited to, esters, aliphatic polyesters, orthoesters, poly(orthoesters), poly(lactides), poly(glycolides), poly(e-caprolactones), poly(hydroxybutyrates), poly(anhydrides), ethylene glycol monoformate, ethylene glycol diformate, diethylene glycol diformate, glyceryl monoformate, glyceryl diformate, glyceryl triformate, triethylene glycol diformate, formate esters of pentaerythritol, and the like, any derivative thereof, and any combination thereof.

In some embodiments, the acid or acid-generating compound may be included in the clean-up fluid in an amount ranging from a lower limit of about 1%, 5%, or 10% by weight of the clean-up fluid to an upper limit of about 20%, 15%, 10%, or 5% by weight of the clean-up fluid, and wherein the concentration of the acid or acid-generating compound may range from any lower limit to any upper limit and encompasses any subset therebetween.

The exemplary fluid loss control enhancement additives described herein may directly or indirectly affect one or more components or pieces of equipment associated with the preparation, delivery, recapture, recycling, reuse, and/or disposal of the fluid loss control enhancement additives described herein. For example, and with reference to FIG. 1, the disclosed fluid loss control enhancement additives may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a wellbore 116 that penetrates various subterranean formations 118.

A pump 120 (e.g., a mud pump) circulates wellbore fluid 122 (e.g., a drilling fluid or a lost circulation pill described herein) through a feed pipe 124 and to the kelly 110, which conveys the wellbore fluid 122 downhole through the interior of the drill string 108 and through one or more orifices in the drill bit 114 (or optionally through a bypass or ports (not shown) along the drill string and above the drill bit 114). The wellbore fluid 122 is then circulated back to the surface via an annulus 126 defined between the drill string 108 and the walls of the wellbore 116. At the surface, the recirculated or spent wellbore fluid 122 exits the annulus 126 and may be conveyed to one or more fluid processing unit(s) 128 via an interconnecting flow line 130. After passing through the fluid processing unit(s) 128, a "cleaned" wellbore fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

One or more of the disclosed fluid loss control enhancement additives may be added to the wellbore fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed fluid loss control enhancement additives may be added to the wellbore fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the disclosed fluid loss control enhancement additives may be stored, reconditioned, and/or regulated until added to the wellbore fluid 122.

As mentioned above, the disclosed fluid loss control enhancement additives may directly or indirectly affect the components and equipment of the drilling assembly 100. For example, the disclosed fluid loss control enhancement additives may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment, The fluid processing unit(s) 128 may further include one or more sensors, gauges, pumps, compressors, and the like used store, monitor, regulate, and/or recondition the exemplary fluid loss control enhancement additives.

The disclosed fluid loss control enhancement additives may directly or indirectly affect the pump 120, which representatively includes any conduits, pipelines, trucks, tubulars, and/or pipes used to fluidically convey the fluid loss control enhancement additives downhole, any pumps, compressors, or motors (e.g., topside or downhole) used to drive the fluid loss control enhancement additives into motion, any valves or related joints used to regulate the pressure or flow rate of the fluid loss control enhancement additives, and any sensors (i.e., pressure, temperature, flow rate, etc.), gauges, and/or combinations thereof, and the like. The disclosed fluid loss control enhancement additives may also directly or indirectly affect the mixing hopper 134 and the retention pit 132 and their assorted variations.

The disclosed fluid loss control enhancement additives may also directly or indirectly affect the various downhole equipment and tools that may come into contact with the fluid loss control enhancement additives such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed fluid loss control enhancement additives may also directly or indirectly affect any downhole heat exchangers, valves and corresponding actuation devices, tool seals, packers and other wellbore isolation devices or components, and the like associated with the wellbore 116. The disclosed fluid loss control enhancement additives may also directly or indirectly affect the drill bit 114, which may include, but is not limited to, roller cone bits, PDC bits, natural diamond bits, any hole openers, reamers, coring bits, etc.

While not specifically illustrated herein, the disclosed fluid loss control enhancement additives may also directly or indirectly affect any transport or delivery equipment used to convey the fluid loss control enhancement additives to the drilling assembly 100 such as, for example, any transport vessels, conduits, pipelines, trucks, tubulars, and/or pipes used to fluidically move the fluid loss control enhancement additives from one location to another, any pumps, compressors, or motors used to drive the fluid loss control enhancement additives into motion, any valves or related joints used to regulate the pressure or flow rate of the fluid loss control enhancement additives, and any sensors (i.e., pressure and temperature), gauges, and/or combinations thereof, and the like.

Embodiments disclosed herein include:

A. a method that involves treating a wellbore penetrating a subterranean formation with a pill comprising an aqueous base fluid and a lost circulation material; observing fluid loss from the wellbore to the subterranean formation while treating the wellbore with the pill; and adding salt, a swellable polymer, and fibers to the pill;

B. a method that involves treating a wellbore penetrating a subterranean formation with a first pill comprising a first aqueous base fluid and a lost circulation material; observing fluid loss from the wellbore to the subterranean formation after completion of treating the wellbore with the first pill; and treating the wellbore with a second pill comprising a second aqueous base fluid, a salt, a swellable polymer, and fibers; and C. a system that includes a drilling platform operably coupled to a drill string that extends into a wellbore penetrating a subterranean formation; a drill bit attached to the distal end of the drill string; a pill comprising an aqueous base fluid, a salt, a swellable polymer, and fibers; a pump operably connected to the drill string for pumping the pill fluid through at least a portion of the drill string; and optionally further comprising ports or a bypass along the drill string and upstream of the drill bit.

Each of embodiments A, B, and C may have one or more of the following additional elements in any combination: Element 1: wherein the lost circulation material is present in the pill (or the first pill) at about 40 pounds per barrel ("ppb") to about 120 ppb; Element 2: wherein the salt is present in the pill (or the second pill) at about 0.5 ppb to about 2.5 ppb; Element 3: wherein the salt comprises at least one selected from the group consisting of: sodium chloride, sodium bromide, potassium chloride, potassium bromide, and any combination thereof; Element 4: wherein the swellable polymer is present in the pill (or the second pill) at about 1 ppb to about 10 ppb; Element 5: wherein the swellable polymer comprises at least one selected from the group consisting of: a crosslinked polyacrylamide, a crosslinked polyacrylate, a copolymer of acrylamide and acrylate monomers, a starch backbone grafted with acrylonitrile and acrylate, hydrolyzed polyacrylonitrile, a carboxyalkyl cellulose, a carboxymethyl starch, a salt of carboxymethyl cellulose, a carboxyalkyl polysaccharide, and any combination thereof; Element 6: wherein the swellable polymer comprises a polymer of two or more of: allylsulfonate, 2-acrylamido-2-methyl-1-propanesulfonic acid, 3-allyloxy-2-hydroxy-1-propane-sulfonic acid, acrylamide, an acrylic acid monomer, and N-vinylpyrrolidone; Element 7: wherein the fibers are present in the pill (or the second pill) at about 0.25 ppb to about 3 ppb; and Element 8: wherein the fibers comprise at least one selected from the group consisting of: viscose cellulosic fibers, oil coated cellulosic fibers, carbon fibers, melt-processed inorganic fibers, basalt fibers, woolastonite fibers, non-amorphous metallic fibers, ceramic fibers, glass fibers, polymeric fibers, polypropylene fibers, poly (acrylic nitrile) fibers, and any combination thereof. Each of embodiments A and B may have one or more of the following additional elements in any combination: Element 9: wherein the salt, the swellable polymer, and the fibers are added to the pill (or the second pill) simultaneously; Element 10: wherein the salt, the swellable polymer, and the fibers are added to the pill (or the second pill) independently; and Element 11: the method further including treating the wellbore with a cleanup fluid comprising at least one of: an acid or an acid-generating compound.

By way of non-limiting example, exemplary combinations applicable to Embodiments A, B, and C include: Element 2 in combination with Element 3; Element 4 in combination with Element 5; Element 4 in combination with Element 6; Element 7 in combination with Element 8; at least two of Elements 2, 4, or 7 in combination with at least one of Elements 3, 5, 6, or 8; and any of the foregoing in combination with Element 1. By way of non-limiting example, exemplary combinations applicable to Embodiments A and B include: any of the above applicable to Embodiment A or B in combination with Element 9 or 10; any of the above applicable to Embodiment A or B in combination with Element 11; one of Elements 1-8 in combination with Element 9 or 10 and optionally Element 11; and one of Elements 1-8 in combination with Element 11.

Unless otherwise indicated, all numbers expressing quantities of ingredients, properties (e.g., molecular weight and reaction conditions), and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments disclosed herein are presented herein. Not all features of a physical implementation are described or shown in this application for the sake of clarity. It is understood that in the development of a physical embodiment incorporating the embodiments of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure.

To facilitate a better understanding of the embodiments of the present disclosure, the following examples of preferred or representative embodiments are given. In no way should the following examples be read to limit, or to define, the scope of the disclosure.

EXAMPLES

Three fluid loss control enhancement additives (Table 1) were tested with a particle plugging test as a measure or indication of the ability of the additives to plug larger fractures and arrest severe fluid loss.

TABLE 1

|  | Swellable Polymer | Fibers | Salt |
| --- | --- | --- | --- |
| Additive 1 | 70 wt % DIAMOND SEAL ® | 15 wt % polypropylene fibers | 15 wt % NaCl |
| Additive 2 | 70 wt % CRYSTALSEAL ® | 15 wt % viscose fibers | 15 wt % NaCl |
| Additive 3 | 70 wt % REON ™ | 15 wt % viscose fibers | 15 wt % NaCl |

DIAMOND SEAL ® - water-swellable, synthetic polymer available from Halliburton Energy Services, Inc. (particle size before swelling about 4 mm)
CRYSTALSEAL ® - crosslinked polyacrylamide available from Halliburton Energy Services, Inc. (particle size before swelling about 2 mm)
REON ™ - starch-based superabsorbent polymer available from Absorbent Technologies, Inc. (particle size before swelling about 2 mm)

Figure 3:
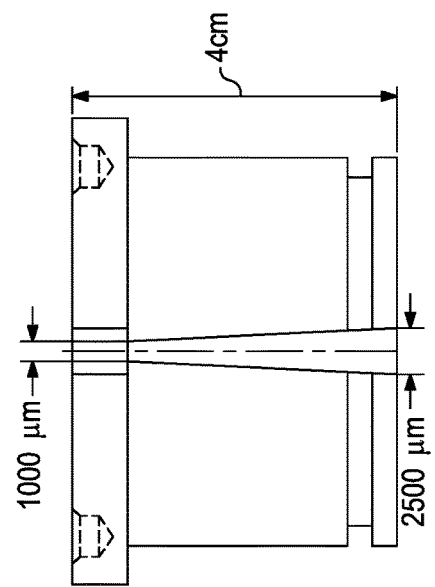
FIG. 3 shows an illustrative schematic of a tapered slot.
Figure 2:
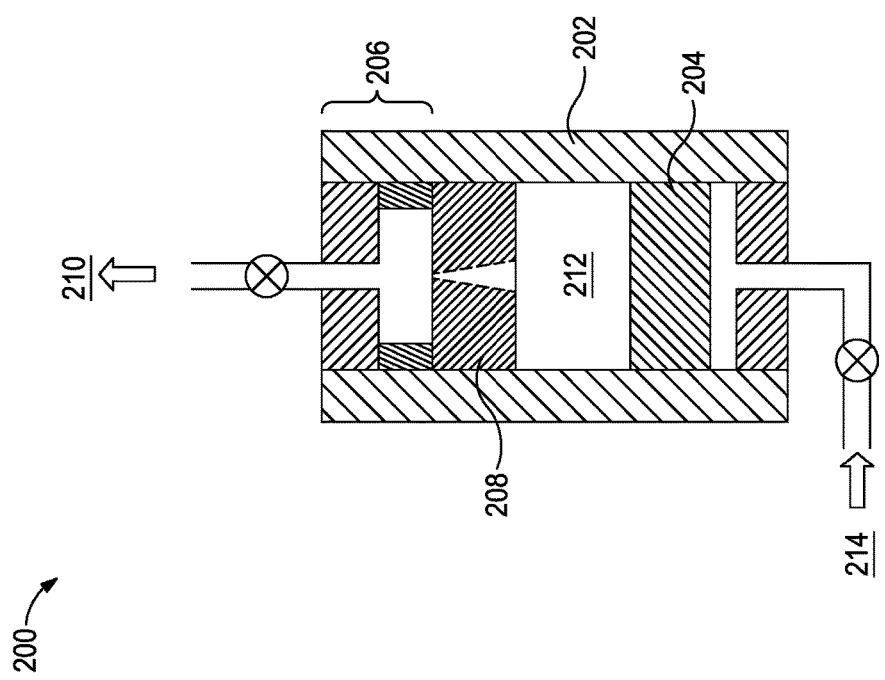
FIG. 2 shows an illustrative schematic of a pore plugging apparatus.

Samples were prepared by combining water, a lost circulation material at 50 ppb or 80 ppb, and an additive in an amount to yield 3.5 ppb of the swellable polymer, 0.75 ppb of salt, and 0.75 ppb of fibers. The samples were left undisturbed for 2 hours to allow the swellable polymer to swell. Fluid loss control for the samples was evaluated with a Particle Plugging Apparatus 200 illustrated in FIG. 2. The Particle Plugging Apparatus 200 consists of a 500-mL volume cell 202 that has a movable piston 204 at the bottom. At the top, the cell 202 has an assembly 206 for positioning and securing a tapered slot 208 (or other filter media). The cell pressure 214 is applied by a two-stage hydraulic pump or using a nitrogen pressure line. Pressure 214 is transferred to the sample 212 through the floating piston 204 in the cell 202. During testing, the cell 202 is positioned such that the pressure is applied from the bottom of the cell 202 and the filtrate 210 collected from the top. This prevents other components of the sample 212 that settle during the static period of the test from contributing to the performance of the sample 212. A schematic of an example tapered slot is provided in FIG. 3. The performance of the particulate is determined by the ability of the particulate to form an impermeable plug or bridge in the tapered slot, which may mimic arresting fluid loss through fractures in a subterranean formation.

Table 2 provides the results of various pore plugging experiments with tapered slots having inlet/outlet sizes of 2500 microns/1000 microns and 3500 microns/2000 microns.

TABLE 2

| (slot size 2500 microns/1000 microns) | | | |
| --- | --- | --- | --- |
| LCM | Additive | Fluid Loss (g) 2500μ/1000μ Slot | Fluid Loss (g) 3500μ/2500μ Slot |
| 50 ppb STOPPIT ™ | 1 | 6 | 80 |
| 50 ppb STOPPIT ™ | 2 | 7 | 83 |
| 50 ppb STOPPIT ™ | 3 | 6 | 40 |
| 80 ppb STOPPIT ™ | 1 | 10 | 27 |
| 80 ppb STOPPIT ™ | 2 | 3 | 15 |
| 80 ppb STOPPIT ™ | 3 | 7 | 7 |
| 50 ppb BDF ™-562 | 1 | 15 | 90 |
| 50 ppb BDF ™-562 | 2 | 15 | 20 |
| 50 ppb BDF ™-562 | 3 | 10 | 70 |
| 80 ppb BDF ™-562 | 1 | 10 | 5 |
| 80 ppb BDF ™-562 | 2 | 10 | 16 |
| 80 ppb BDF ™-562 | 3 | 6 | 30 |

STOPPIT ™ - engineered, composite lost circulation material available from Halliburton Energy Services, Inc.
BDF ™-562 - engineered, composite lost circulation material available from Halliburton Energy Services, Inc. (particle size before swelling about 4 mm)

This example demonstrates that the use of fluid loss control enhancement additives improve the plugging capability of the conventional lost circulation materials (i.e., faster plugging with less fluid lost) in larger slots. This indicates that the fluid loss control enhancement additives described herein may be effective at plugging larger fractures or high permeability portions of a subterranean formation that may be the cause of fluid loss even after treatment with a traditional LCM.

Therefore, the present disclosure is well adapted to attain the ends and advantages mentioned as well as those that are inherent therein. The particular embodiments disclosed above are illustrative only and may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method of fluid loss control, the method comprising:
    preparing a pill at a surface of a well bore, wherein the pill comprises:
        an aqueous base fluid, and
        a lost circulation material;
    pumping the pill to a subterranean formation through the wellbore, wherein the pill is pumped down a drill string and through a drill bit into the subterranean formation;
    allowing the pill to treat the subterranean formation and circulating at least a portion of the pill back to the surface of the subterranean formation;
    observing a severe fluid loss from the wellbore to the subterranean formation at a rate of about 100 barrels per hour or greater while treating the wellbore with the pill;
    after observing the severe fluid loss, adding a fluid loss control enhancement additive to the pill, wherein the fluid loss control enhancement additive comprises:
        a salt,
        a swellable polymer, and
        fibers, wherein the salt is present in the pill in the amount of about 0.5 ppb to about 2.5 ppb;
    pumping the pill down the drill string and through a drill bit into the subterranean formation;
    allowing the pill to treat the subterranean formation, wherein the swellable polymer swells to at least about 10 times its original volume or greater as it absorbs water,
    wherein the fluid loss control enhancement additive works in combination with the lost circulation material to reduce or altogether stop lost circulation in the wellbore; and
    introducing an acid or acid generating compound into the wellbore and contacting the swellable polymer thereby at least partially degrading the swellable polymer, wherein the acid is at least one of hydrobromic acid, hydrofluoric acid, formic acid, acetic acid, chloroacetic acid, dichloroacetic acid, trichloroacetic acid, fluoroacetic acid, difluoroacetic acid, trifluoroacetic acid, methanesulfonic acid, citric acid, and any combination thereof.

2. The method of claim 1, wherein the lost circulation material is present in the pill at about 40 pounds per barrel ("ppb") to about 120 ppb.

3. The method of claim 1, wherein the salt, the swellable polymer, and the fibers are added to the pill simultaneously.

4. The method of claim 1, wherein the salt, the swellable polymer, and the fibers are added to the pill independently.

5. The method of claim 1, wherein the salt comprises at least one selected from the group consisting of: sodium chloride, sodium bromide, potassium chloride, potassium bromide, and any combination thereof.

6. The method of claim 1, wherein the swellable polymer is present in the pill at about 1 ppb to about 10 ppb.

7. The method of claim 1, wherein the swellable polymer comprises at least one selected from the group consisting of: a crosslinked polyacrylamide, a crosslinked polyacrylate, a copolymer of acrylamide and acrylate monomers, a starch backbone grafted with acrylonitrile and acrylate, hydrolyzed polyacrylonitrile, a carboxyalkyl cellulose, a carboxymethyl starch, a salt of carboxymethyl cellulose, a carboxyalkyl polysaccharide, and any combination thereof.

8. The method of claim 1, wherein the swellable polymer comprises a polymer of two or more of: allylsulfonate, 2-acrylamido-2-methyl-1-propanesulfonic acid, 3-allyloxy-2-hydroxy-1-propane-sulfonic acid, aclylamide, an acrylic acid monomer, and N-vinylpyrrolidone.

9. The method of claim 1, wherein the fibers are present in the pill at about 0.25 ppb to about 3 ppb.

10. The method of claim 1, wherein the fibers comprise at least one selected from the group consisting of: viscose cellulosic fibers, oil coated cellulosic fibers, carbon fibers, melt-processed inorganic fibers, basalt fibers, wollastonite fibers, non-amorphous metallic fibers, ceramic fibers, glass fibers, polymeric fibers, polypropylene fibers, poly(acrylic nitrile) fibers, and any combination thereof.

11. The method of claim 1 wherein the acid generating compound is at least one of an ester, aliphatic polyesters, orthoesters, poly(orthoesters), poly(lactides), poly(glycolides), poly(e-caprolactones), poly(hydroxybutyrates), poly(anhydrides), ethylene glycol monoformate, ethylene glycol diformate, diethylene glycol diformate, glyceryl monoformate, glyceryl diformate, glyceryl triformate, triethylene glycol diformate, formate esters of pentaerythritol, and combinations thereof.

12. A method of fluid loss control comprising:
    preparing a first pill at a surface of a well bore, wherein the pill comprises:
        an aqueous base fluid, and
        a lost circulation material;

pumping the first pill to a subterranean formation through the wellbore, wherein the first pill is pumped down a drill string and through a drill bit into the subterranean formation;

observing severe fluid loss from the wellbore to the subterranean formation at a rate of about 100 barrels per hour or greater after completion of treating the wellbore with the first pill;

after observing the severe fluid loss, treating the wellbore with a second pill comprising a second aqueous base fluid and a fluid loss control enhancement additive, wherein the fluid loss control enhancement additive comprises a salt comprising sodium chloride, a swellable polymer comprising crosslinked polyacrylamide, and fibers comprising viscose, wherein the salt is present in the second pill in the amount of about 0.5 ppb to about 2.5 ppb;

pumping the pill down the drill string and through a drill bit into the subterranean formation;

allowing the pill to treat the subterranean formation, wherein the swellable polymer swells to at least about 10 times its original volume or greater as it absorbs water, wherein the fluid loss control enhancement additive works in combination with the lost circulation material to reduce or altogether stop lost circulation in the wellbore; and introducing an acid or acid generating compound into the wellbore and contacting the swellable polymer thereby at least partially degrading the swellable polymer, wherein the acid is at least one of hydrobromic acid, hydrofluoric acid, formic acid, acetic acid, chloroacetic acid, dichloroacetic acid, trichloroacetic acid, fluoroacetic acid, difluoroacetic acid, trifluoroacetic acid, methanesulfonic acid, citric acid, and any combination thereof.

13. The method of claim 12, wherein the lost circulation material is present in the first pill at about 40 pounds per barrel ("ppb") to about 120 ppb.

14. The method of claim 12, wherein the swellable polymer is present in the pin at about 1 ppb to about 10 ppb.

15. The method of claim 12, wherein the fibers are present in the pill at about 0.25 ppb to about 3 ppb.

* * * * *